April 7, 1959 V. A. KOLESH 2,880,768
HARD METAL TIPPED SAW
Original Filed Oct. 4, 1954
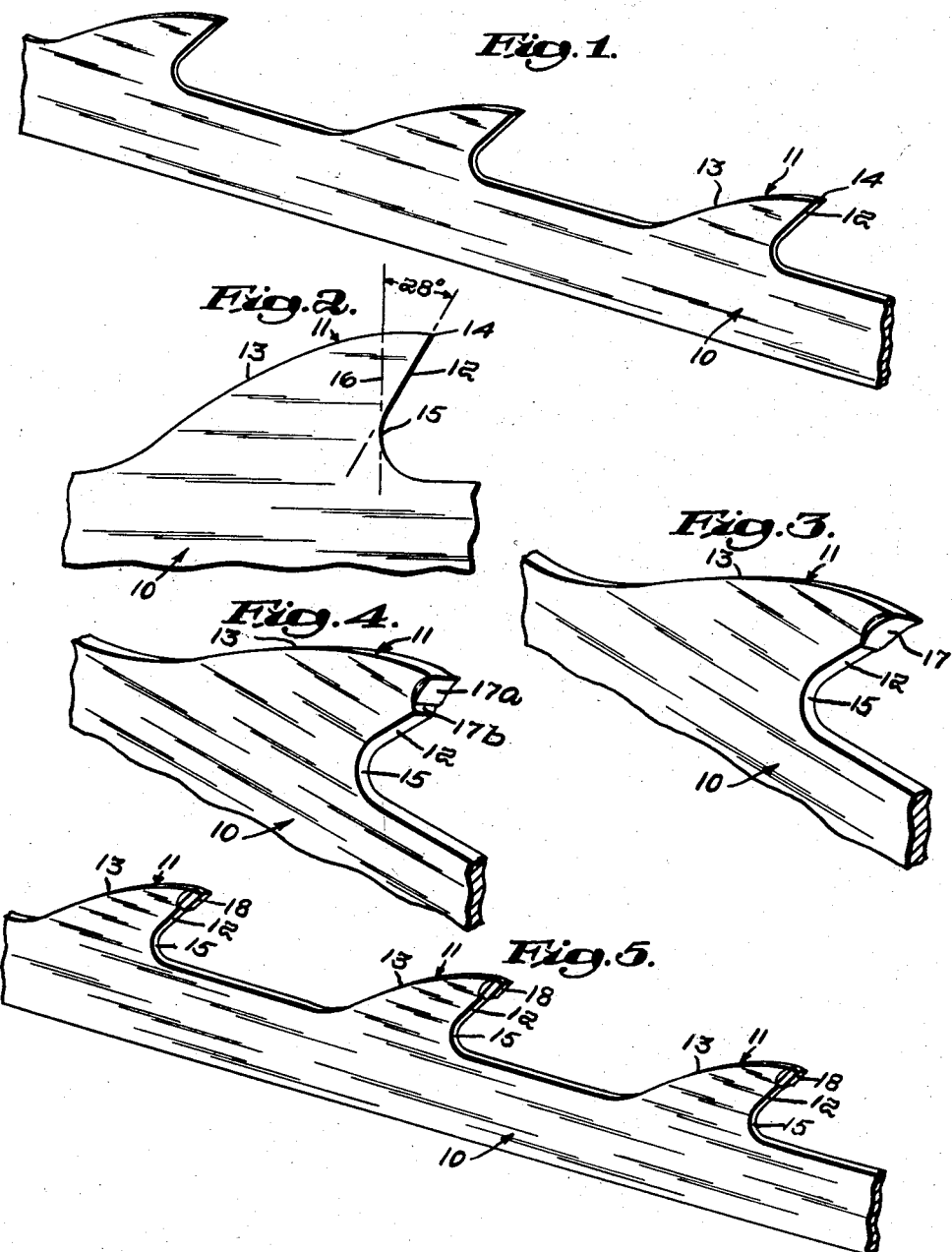
Inventor:
Victor A. Kolesh,
by Emery, Booth, Townsend, Miller & Weidner
Attys United States Patent Office 2,880,768
Patented Apr. 7, 1959

2,880,768

HARD METAL TIPPED SAW

Victor A. Kolesh, Holden, Mass., assignor to Simonds Saw & Steel Co., Fitchburg, Mass., a corporation of Massachusetts Original application October 4, 1954, Serial No. 460,130, now Patent No. 2,826,941, dated March 18, 1958. Divided and this application July 10, 1957, Serial No. 670,959

4 Claims. (Cl. 143—133)

This invention relates generally to saws and more particularly to saws of the type defined by a thin flexible section. It aims to provide an improved flexible thin-section type saw uniquely formed and fitted with a hard metal cutting tip.

This application is a divisional of my copending parent application Serial No. 460,130, filed October 4, 1954, now patent No. 2,826,941, granted January 17, 1958.

Saws of the class here concerned, comprising particularly the flexible band type, adapted to the cutting of wood and also non-ferrous metals such as aluminum, have many and varied applications. They are employed, for example, in saw mills whose profitable operation will be understood to permit only minimum interruption for removal and replacement of the saw, as for repair of teeth injured by the hard spots and the still harder foreign matter encountered in the wood. It will be appreciated by those skilled in the art that various factors inhibit the incorporation of the desired hardness and wearing qualities in the structure or composition of these mill saws, particularly those of the band type, which necessarily reflect a compromise between hardness and flexibility even in the region of the teeth which by reason of their characteristic hooked or forwardly raked contour, are themselves flexed in passing over the band wheels. Similarly the application as to the teeth of a separate harder or harder surfaced facing or cutting point, bit or tip has not been successfully achieved in the case of the flexible thin-section saws with which the invention is concerned, which saws have been found to provide an insufficient support or bearing area for the same. This invention overcomes the recited problems and difficulties, and provides a flexible thin-section saw which is faster cutting, longer-lived and more durable.

The invention will be better understood from a consideration of the following specification taken in conjunction with the accompanying drawing in which:

Fig. 1 is a perspective view of a section of a hand saw of the flexible thin-section type here concerned;

Fig. 2 is a larger scale elevation of one of the teeth of the saw;

Figs. 3 and 4 illustrate steps in the method of treating the saw in accordance with the invention; and Fig. 5 illustrates a finished saw of the invention.

Referring now more particularly to Fig. 1, I there show a fragment of a flexible thin-section saw to which the invention has been successfully applied and comprising a band 10 formed with a series of spaced teeth 11 having each a front and back face 12, 13 merging at a point 14. The wood cutting band saw such as herein selected for purposes of illustration only will be seen to have a hook angle of, or a front face 12 characteristically raked forwardly at approximately 28° or more, and further to present a slightly convex back face 13 merging therewith at an acute angle to form the cutting point 14. Saws of the flexible thin-section class or type as herein referred to will be understood as those of the order of thickness up to about $\frac{1}{16}$ in. for band saws of up to 2 inches in width, with the order of thickness up to about $\frac{1}{8}$ in. for wider band saws, and with attendant flexibility to present a thin flexible section as appropriate for pulley drive in endless band form.

As already noted a consideration in the design and construction of saws is the provision of cutting teeth of maximum hardness whereby the saw cuts faster, with less wear, and through harder materials, with minimum chance of injury to the saw. But the hardness permitted the saw body proper and particularly the saw teeth is limited by the tough non-brittle qualities also required to sustain the saw under the strain, tension and shock to which it is subjected, and particularly in the band type, by the degree of elasticity required therefor. Thus, and while certain circular saws have been constructed with separate inserted hard metal points, bits or tips, it has not been possible heretofore to apply hard metal bits or tips to the flexible thin-section saws with which the invention is concerned, of the order of thickness above stated.

These saws have been found to provide an insufficient lateral or transverse bearing surface for the secure bonding or welding thereto of the harder-faced material or element such as novelly provided them by the invention. It will be appreciated that the strength which may be effected in the bond between the tooth and tip is limited by the size or area of the surface over which it may be applied. Where, for example, the thickness of the saw is $\frac{1}{16}$ in. and the tip is seated say $\frac{1}{4}$ in. from the point or back face of the tooth the area of contact between the tooth and tip will be but $\frac{1}{64}$ sq. in., or insufficient to support a bond of the necessary strength and firmness. It will be appreciated also, and at least in the case of the band type, that the flexing or bending of the saw in use additionally inhibits the strong and permanent securing or bonding of the hard metal piece such as employed for the novel cutting tip of the invention.

In accordance with the invention, then, and considering now more particularly Figs. 3 and 4, a flexible thin-section saw is treated by swaging rearwardly, as with a hammer, upset, die or the like metal forming tool, the front face 12 of the tooth 11 in the region indicated at 17, Fig. 3. More particularly, the tooth material or metal at the point 14 and down the front face 12 a distance approximating the height of the tip, and which may be $\frac{1}{4}$ in. or so, is forced or flowed an appreciable distance back of the original line of the front face as shown, but in such manner as not to displace the entire tip-defining portion of the tooth, and thus without appreciable deformation of the back face 13. The described treating of the tooth is substantially confined, in other words, to the region lying to the right or forwardly of the vertical or radius line 16 tangent to the gullet 15, Fig. 2. It follows that the rearward flowing of the metal proximate the front face only is accompanied by a substantial thickening or widening of the tooth body thereat, so as to present a front face portion which is depressed, and also slightly concave, and which may be increased to twice its original width and area. A surface or platform to which the bit or tip may be brazed or welded with greatly enhanced strength and stability is thus provided. Further, and importantly as applied to band saws, such surface is seen to be constructed and arranged pursuant to the invention wholly in the tip supporting area above mentioned, which area will be understood to be substantially free from flexure in operation, by reason of its situation outward and forward of the tooth gullet as described.

Further in accordance with the invention the swaged or tip-backing portion 17 is ground or squared off to provide a step or seat having straight and well-defined back and bottom surfaces 17a, 17b, Fig. 4. This may be accomplished by conventional method and means such as otherwise employed for shaping and finishing the saw.

The hard metal element or piece, herein the bit or tip 18, Fig. 5, is next applied to the seat 16. This hard metal cutting bit or tip 18 may be cast, forged or otherwise fashioned of stellite, boron carbide, tungsten carbide, or the like material or metal of special or superior hardness. While my invention is not so limited, it is adapted particularly to the application of the bit or tip to the front face only of the tooth, to which it may be joined or secured with solder or other welding or brazing agent as shown. It will be observed, however, that the strength of the bond between tooth and tip may be enhanced by applying the silver or other bonding agent to the sides as well as to the front face of the tooth, and thereby developing a fillet at the juncture of said sides with the back face of the seated and soldered tip.

Still further in accordance with the invention, and following the applying and securing of the hard metal tip as just described, the appropriate saw portions and particularly the tip-mounting teeth are ground and polished to the desired finish. The saw may then be subjected to such other final testing and treating operations as are appropriate to its individual purposes and requirements.

From the foregoing it will be appreciated that I have provided a new and improved flexible thin-section saw wherein a harder face material is novelly applied to the saw teeth, and wherein in the present embodiment the teeth of such flexible thin-section saw are uniquely formed and fitted with hard metal cutting tips.

It will be understood that my invention is not limited to the particular embodiment thereof illustrated and described herein, and I set forth its scope in my following claims.

I claim:

1. A new and improved flexible thin-section band saw comprising a band formed at one edge with a series of spaced teeth, said teeth widened at the points and there formed to present set-back step-like seats of substantially increased lateral area presenting relatively angularly disposed platform and backer walls for tips, and hard metal tips of like lateral area anchored to said walls of said seats.

2. A saw of the class concerned and characterized initially by teeth wholly of thin flexible section, the points of said teeth being laterally spread to present front face portions of substantially increased width over that of the saw section, said portions formed to define L-like recessed seats of substantially greater area than that of the initial faces thereat, and hard metal tips of like area as and firmly supported at said seats.

3. A band saw according to claim 2 wherein the front faces of said teeth incline forwardly at substantially 28 degrees or more, and whereby said tips are seated and supported at flexure free tooth portions lying forwardly and outwardly of the tooth gullets.

4. In a flexible thin-section saw the improvement providing harder surfaced and longer lived teeth and comprising front faces on such teeth upset to present at the points thereof rearwardly and laterally swaged tip-seating recesses with forwardly and upwardly facing walls, and hard metal tips applied to and supported by substantially the entirety of the walls of said seats.

References Cited in the file of this patent
UNITED STATES PATENTS

| | | |
|---|---|---|
| 2,126,382 | Goff et al. | Aug. 9, 1938 |
| 2,318,549 | Wilkie | May 4, 1943 |
| 2,664,923 | Ferrari | Jan. 5, 1954 |
| 2,714,317 | Drake | Aug. 2, 1955 |